W. MAUERSBERGER.
APPARATUS FOR SHAPING PULP LAYERS.
APPLICATION FILED APR. 27, 1914.

1,149,669. Patented Aug. 10, 1915.

UNITED STATES PATENT OFFICE.

WALTHER MAUERSBERGER, OF PENIG, GERMANY, ASSIGNOR TO ALLGEMEINE TREUHAND-AKTIENGESELLSCHAFT, OF DRESDEN, GERMANY.

APPARATUS FOR SHAPING PULP LAYERS.

1,149,669.     Specification of Letters Patent.     Patented Aug. 10, 1915.

Application filed April 27, 1914. Serial No. 834,850.

*To all whom it may concern:*

Be it known that I, WALTHER MAUERSBERGER, engineer, a subject of the German Empire, residing at Penig, i. S., Germany, have invented certain new and useful Improvements in Apparatus for Shaping Pulp Layers, of which the following is a specification.

This invention relates to a device for making articles of paper, cardboard or the like. It is known to make such articles by superimposing a number of thin layers in a mold. This method of operation, however, has the disadvantage that the layer of fibrous material separates from the side walls of the mold as soon as the pressure applying medium is removed.

According to this invention the separation of the layers is prevented by introducing air between the superimposed layers and the supporting sieve or mold. When an expansible sieve is used the device may be of such a form that the strength or rigidity of the sieve is less toward one end, preferably the end remote from that by which the air is introduced and expelled. In this way the parts of the wall of the sieve which offer least resistance are the first to be separated from the superposed layers of paper or the like, and consequently the separation of the layers from the sieve or forming body may be effected in a gradual manner and with less stress or strain at the surfaces of separation. Such a formation of the sieve has the further advantage that when the operation of pressing is commenced those parts of the sieve or the like by which the air is expelled are the first to come in contact with the outer mold. The air between the outer mold and the newly pressed in layer, or between the layers already pressed in and the newly pressed in layer, is caused to pass gradually from the interior or more remote parts of the mold toward the escape openings or edges. If the sieve or like body were made of uniform strength throughout there would be a tendency to form bubbles or air pockets which would cause the formation or production of mis-shaped objects.

The invention will be more readily understood from the devices illustrated by way of example in the accompanying drawings, in which—

Figure 1:
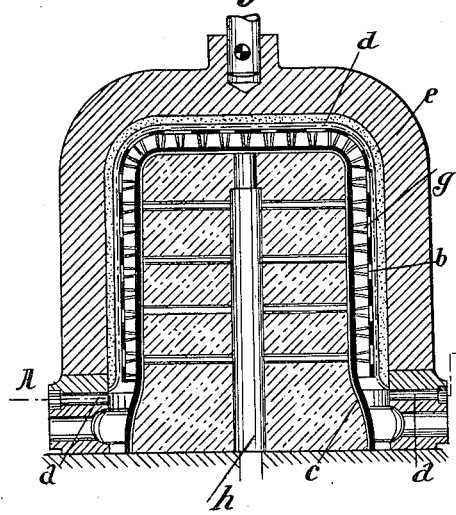
Figure 2:
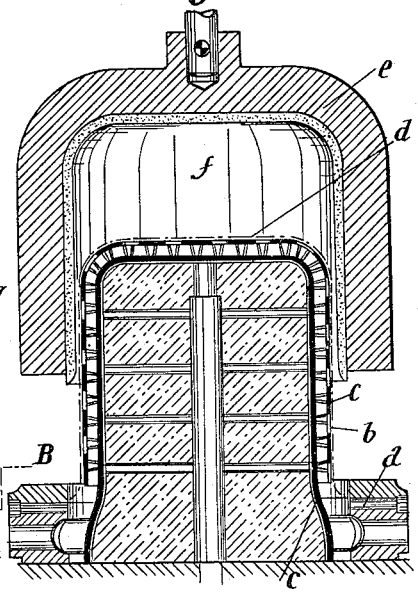
Figure 3:
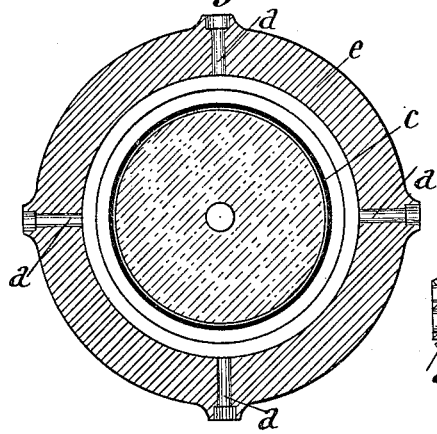
Figure 4:
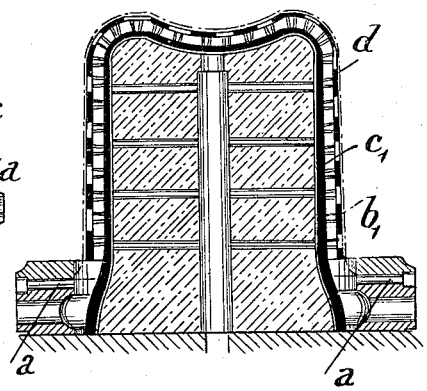

Figure 1 is a cross-section of a mold or molding apparatus with the parts in position to press in a layer, while Fig. 2 is a view of the device with the form or mold raised. Fig. 3 is a cross-section of the device. Fig. 4 shows a part of the device, namely, the sieve of another form of the invention. The sieve in this case is of a less resisting nature at its upper end. The core in this case is also composed of a water tight wall $c$ and a porous wall $b$.

In carrying the invention into effect according to the form shown in Figs. 1 to 3, the two walls $c$ and $b$ are connected by crossbars $g$. Over the outer wall $b$ there is stretched a sieve $d$, which may conveniently be made of rubber or the like. The purpose of the sieve will appear from the following description of the operations performed. The sieve body described is adapted to be surrounded by an outer form or mold $e$.

The material $f$, such as cardboard or paper, is laid on the sieve when the outer mold $e$ is raised, whereupon the outer mold is passed over the sieve and pressed down tightly thereon. Water or other suitable pressure medium is introduced by the passage $h$ to the interior of the water tight wall $c$, whereby the layer of material $f$ is pressed against the interior of the outer mold $e$ or against any layers which have already been laid on the interior of the mold and water or surplus moisture in the material is squeezed through the sieve and run down so as to drain out through conduits at the bottom of the apparatus. When the water or the like is turned off air is introduced by the passages $a$ into the space between the laid on layer of paper and the impervious wall $c$. This air, which is preferably under pressure, is also allowed to pass between the sieve and the outer form or mold $e$ when the latter is raised. This result is obtained by allowing the air from the passage $a$ to collect in an annular chamber with which the bottom open end of the sieve communicates.

In the form of the invention according to Fig. 4 as mentioned above the strength or rigidity of the resilient and impervious wall $c'$ is reduced toward the upper end as can be seen in the drawing by the diminished thickness. In this way when the water under pressure is introduced to the space within the impervious wall, the upper part expands first and presses the paper or the like layer against the mold whereby the air at the side of the mold most remote from the outlet is expelled first. As the pressure rises and the impervious wall *c* gradually expands, the air is so to speak swept from the more remote parts toward the annular opening at the bottom of the sieve in Fig. 4. In Fig. 4 both the walls *b'* and *c'* are thinner and consequently of a more resilient nature at the upper end, but it will be understood that the resiliency may if desired be confined to one only and the resilient properties may be supplied in any convenient manner.

According to the form shown in Fig. 4 the upper end of the sieve is hollowed so as to offer rather less resistance to the water pressure. With this construction the displacement of the impervious wall extends gradually from the center of the hollow portion outward and then downward through the cylindrical portion. When the pressure is released the reverse relations obtain, that is to say, the more rigid portions contract first and the less rigid portions contract subsequently, so that the air passes in a gradual manner between the sieve and the laid or pressed on layer of material. By this means all formation of bubbles or blisters is prevented.

I claim:—

1. In a device of the character described, an outer hollow mold, a resilient core, an elastic pressure sieve, mounted upon said core within said mold, and means for supplying air to the space between the elastic pressure sieve and the superposed paper layers molded, substantially as described.

2. In a device of the character described, an outer hollow mold, an elastic and impervious hollow core within said outer mold, a sieve supported by said core on the outside thereof, means for supplying a fluid to expand said impervious core, and means for introducing a separating agent between said sieve and the superposed paper layers molded, substantially as described and for the purpose set forth.

3. In a device of the character described, a hollow mold, a resilient core, said resilient core being more resilient at the point adapted to contact within the base of the mold than at the points adjacent to the outer portion of the mold, and means for introducing air between the core and the mold.

4. In a device of the character described, an elastic and impervious hollow core, a porous wall supported by cross bars on said hollow core, a sieve thereon, an outer mold adapted to press a layer or layers of paper on said sieve, means for supplying a fluid to expand said impervious hollow core, and means for introducing air between said layer of paper and hollow core.

5. In a device of the character described, an elastic and impervious hollow core being more resilient at the point adapted to contact within the base of the outer mold than at the points adjacent to the outer portion of said outer mold, a porous wall supported by cross bars on said hollow core, a sieve thereon, an outer mold adapted to press a layer or layers of paper on said sieve, means for supplying a fluid to expand said impervious hollow core, and means for introducing air under pressure between said layer or layers of paper and impervious core.

In testimony whereof I have signed my name to this specification in the presence of two subscribing witnesses.

WALTHER MAUERSBERGER.

Witnesses:
F. C. HEYER,
W. H. MÜCKE.